Patented Oct. 25, 1932

1,884,255

UNITED STATES PATENT OFFICE

ALLEN ROGERS, OF BROOKLYN, NEW YORK, ASSIGNOR TO THE BARRETT COMPANY, OF NEW YORK, N. Y., A CORPORATION OF NEW JERSEY

NITROCELLULOSE LACQUER

No Drawing.    Application filed January 27, 1930.  Serial No. 423,897.

My invention relates to lacquers and similar coating materials and particularly to nitrocellulose lacquers containing resins of the coumarone and indene type.

The customary lacquer constituents may be divided into five principal groups, namely: nitrocellulose, gums or resins, solvents, diluents and plasticizers. The division is approximate only, since the functions of the groups may overlap. The gum or resin constituents ordinarily consist of natural resins, such as damar, elemi, shellac, and kauri. These resins are expensive and, therefore, attempts have been made to produce lacquers in which the gum or resin present consisted of some cheaper material. So-called coumarone resin, made by polymerizing coumarone, indene and related compounds (hereinafter referred to as coumarone resin or coumarone-indene type resin), is produced on a large scale in the purification of light oils from coal distillation. It is relatively cheap and well suited to the production of lacquers, varnishes, and similar coating materials. Although attempts have been made heretofore to produce lacquers containing coumarone resin, the lacquer film formed on drying was not clear but had a cloudy or hazy appearance known as "blush", probably due to the precipitation of either the resin or nitrocellulose during evaporation of the liquid components of the lacquer.

Ester gum (rosin ester) which is cheaper than the natural gums, is also used in lacquers, but again when ester gum is used alone as the gum constituent of a lacquer, the film produced is chalky and objectionable in other respects. It has been found necessary to employ with ester gum some other more expensive gum in order to obtain a lacquer which will give a clear film having gloss when dry. Hence, the lacquers produced heretofore have usually contained one or more of the expensive gums, and in no case has a satisfactory lacquer been produced containing substantial amounts of coumarone resins.

The principal object of my invention is to produce a nitrocellulose lacquer in which the expensive natural gums or resins may be eliminated or the proportion thereof reduced in favor of the cheaper synthetic resins. A particular object of my invention is to produce a lacquer, containing coumarone resin in substantial proportions, which will form a film characterized by freedom from blush and possessing high gloss when dry.

These and other objects of my invention will be apparent from the following description thereof.

I have found that in the production of nitrocellulose lacquers, coumarone resins may be introduced in substantial amounts without causing the lacquer to blush by employing in addition to the coumarone resin, one or more resins or gum constituents such as ester gum, glycerol-phthalic anhydride resin or other material which serves to increase the compatibility of the coumarone resins and the nitrocellulose.

In producing lacquers in accordance with my invention, the amount of coumarone resin which can be incorporated in the lacquer varies considerably with the nature and proportions of the other constituents employed such as gums, plasticizers, solvents, etc. The character of the coumarone-indene type of resin is also important. The resin which may be employed is the usual product used in the varnish industry, having a melting point above 110° C., the usual melting point being between 127 and 142° C., although higher melting point grades of the resin may be used. The form of resin which I have used most frequently in producing lacquers has a melting point of about 130–132° C.

I have prepared excellent lacquers containing an amount of the 130° C. melting point coumarone resin, equal to about 3 to 6% by weight of the lacquer and constituting from about 25 to 40% by weight of the total gum content of the lacquer. Gum and nitrocellulose are preferably employed in about equal proportions by weight in the lacquer. However, the gum content may be less than that of the nitrocellulose and may be as much as three times the weight of the nitrocellulose. The total gum content of the lacquer should not ordinarily greatly exceed about 18% of the weight of the lacquer. The gum and nitrocellulose when dissolved in suitable solvents and combined with diluents and plasticizers produce a lacquer which is characterized by freedom from blush. The properties of the lacquer may be controlled very largely by selecting the constituents and proportions to produce the desired characteristics. However, ordinarily lacquers produced in accordance with my invention dry quickly, have a high gloss and may be applied in successive coats without lifting. The film produced is hard and has excellent rubbing properties. The dry film probably contains the nitrocellulose, gums, plasticizer and the oil if oil is employed. There may also be present some of the high boiling constituents of the solvent.

In the formulation of lacquers, as is well known, great care is necessary in selecting constituents and proportions which are compatible. The compatibility of the constituents of the lacquer depends not only on the character of the resins but also upon the nature and proportions of the solvents, diluents and plasticizers employed.

Various forms of nitrocellulose may be employed in producing my lacquer, the particular form of the nitrocellulose being subject to variation. In general, I prefer to employ as solvents for the nitrocellulose, the usual organic esters used as solvents such as ethyl acetate, butyl acetate, butyl propionate and diacetone alcohol. The diluents are ordinarily solvents for the resins such as benzol, toluol, xylol and various petroleum fractions. In some cases butanol, pentanol, ethanol and methanol are used. The plasticizers most commonly employed are dibutyl phthalate and tricresyl phosphate. In addition to these constituents, oils such as castor oil, pine oil and sometimes linseed or rapeseed oils, usually blown or boiled, may be added to the lacquer to increase the flowing properties and decrease the drying time of the material. Pigments may also be added to my lacquer if desired. As alternatives or additives, numerous special or proprietary materials have been successfully introduced into my lacquer.

Any of the above mentioned materials may be employed and the proportions of the constituents varied considerably. It should be borne in mind, however, that changes in the character or quantity of one constituent may necessitate variations in other constituents in order to render all of the constituents compatible and to prevent undesirable changes in the drying time, hardness, rubbing qualities or other properties of the film. These general characteristics of lacquers are well known to those skilled in the art and therefore I give the following examples as typical of lacquers embodying my invention and without intending to limit the invention thereby.

In making my lacquers, the general procedure preferred is as follows: The nitrocellulose, which may be in the form known to the trade as ½ sec. cotton, wet, is mixed with the diluent and when wet down the solvent is added. The mass is stirred until all of the cotton has entered into the solution, when the plasticizer is introduced, followed by the gums or resins and oil, if oil is to be employed.

The proportions of the various constituents in typical examples are as follows, the parts being expressed in percentage by weight:

*Example I*

| | Parts |
|---|---|
| ½ sec. cotton, wet | 8 |
| Diluents: | |
| Butanol | 10 |
| Toluol | 31 |
| Solvents: | |
| Ethyl acetate | 10 |
| Butyl acetate | 25 |
| Plasticizer: | |
| Dibutyl phthalate | 5 |
| Gums: | |
| Ester gum | 7 |
| Coumarone resin | 4 |

The same formula may be employed substituting tricresylphosphate for the dibutyl phthalate.

Other examples of suitable constituents and proportions which may be employed in producing a lacquer in accordance with my invention are as follows:

*Example II*

| | Parts |
|---|---|
| ½ sec. cotton, wet | 8 |
| Diluent: | |
| Toluol | 34 |
| Solvents: | |
| Ethyl acetate | 17 |
| Ethyleneglycol monoethylether | 20 |
| Plasticizer: | |
| Dibutyl phthalate | 5 |
| Gums: | |
| Phthalic anhydride resin | 7 |
| Coumarone resin | 4 |
| Oil: | |
| Pine oil | 5 |

*Example III*

| | Parts |
|---|---|
| ½ sec. cotton, wet | 11 |
| Diluents: | |
| Toluol | 25 |
| Benzol | 5 |
| Butanol | 3 |
| Solvents: | |
| Butyl acetate | 31 |
| Plasticizer: | |
| Dibutyl phthalate | 3 |
| Gums: | |
| Ester gum | 12 |
| Coumarone resin | 6 |
| Oil: | |
| Pine oil | 4 |

*Example IV*

| | Parts |
|---|---|
| ½ sec. cotton, wet | 11 |
| Diluents: | |
| Toluol | 10 |
| Benzol | 25 |
| Butanol | 2 |
| Solvent: | |
| Butyl acetate | 37 |
| Plasticizer: | |
| Dibutyl phthalate | 3 |
| Gums: | |
| Ester gum | 5 |
| Coumarone resin | 3 |
| Oil: | |
| Pine oil | 4 |

Lacquers prepared by any of the above formulæ may be applied in successive coats without causing the under coats to lift. They produce excellent films which dry quickly, are clear and free from blush. When dry the film is hard, has a high gloss, and possesses excellent rubbing properties. It is therefore evident that I have successfully introduced coumarone resin in substantial proportions into a high grade lacquer which, when applied, forms a film characterized by freedom from blush. The other gum constituent employed with coumarone resin in the lacquer may also be a relatively inexpensive gum so that the cost of the lacquer is materially reduced.

I claim:

1. A nitrocellulose lacquer containing a coumarone-indene resin and a resinous product of the group consisting of ester gum and glycerol-phthalic anhydride, the amounts of said resinous constituents contained in the lacquer being such that the lacquer is non-blushing.

2. A nitrocellulose lacquer containing a coumarone-indene resin having a melting point above 110° C. and a resinous product of the group consisting of ester gum and glycerol-phthalic anhydride, the amounts of said resinous constituents contained in said lacquer being such that the lacquer is non-blushing, and the total resinous content being not more than 18 per cent by weight of the lacquer of which approximately from 25 to 40 per cent is coumarone-indene resin.

3. A nitrocellulose lacquer containing a coumarone resin having a melting point of between about 127° C. and about 142° C., and an ester gum, the amounts of said resinous constituents contained in said lacquer being such as the lacquer is non-blushing.

4. A nitrocellulose lacquer containing a coumarone resin having a melting point of between about 127° C. and about 142° C. and glycerol-phthalic anhydride resin, the amounts of said resinous constituents contained in said lacquer being such that the lacquer is non-blushing.

5. A nitrocellulose lacquer consisting of approximately 8% nitrocellulose, about 7% ester gum, about 4% paracoumarone resin, about 41% diluent, about 35% solvent, and about 5% plasticizer.

In witness whereof, I have hereunto set my hand.

ALLEN ROGERS.